United States Patent
Lin et al.

(10) Patent No.: US 7,483,054 B2
(45) Date of Patent: Jan. 27, 2009

(54) IMAGE UNSHARPNESS TEST METHOD FOR A CAMERA DEVICE

(75) Inventors: Peng Wei Lin, Hsinchu (TW); Ming Jiun Leaw, Hsinchu (TW)

(73) Assignee: Altek Corporation, Hsinchu (TW)

( * ) Notice: Subject to any disclaimer, the term of this patent is extended or adjusted under 35 U.S.C. 154(b) by 503 days.

(21) Appl. No.: 11/376,205

(22) Filed: Mar. 16, 2006

(65) Prior Publication Data

US 2007/0216787 A1  Sep. 20, 2007

(51) Int. Cl.
*G03B 13/00* (2006.01)
*H04N 5/232* (2006.01)

(52) U.S. Cl. .................................... 348/208.1; 348/353
(58) Field of Classification Search ............. 348/222.1, 348/345, 346, 353, 208.1, 208.12, 208.15; 382/255
See application file for complete search history.

(56) References Cited

U.S. PATENT DOCUMENTS 5,003,165 A * 3/1991 Sarfati et al. ................ 396/111
2003/0118245 A1* 6/2003 Yaroslavsky et al. ........ 348/353
2005/0206774 A1* 9/2005 Tsujimoto .................... 348/345
2005/0259175 A1* 11/2005 Hoshuyama ................. 348/345
2007/0098292 A1* 5/2007 Batur .......................... 382/261
2007/0153233 A1* 7/2007 Campin et al. .............. 351/206
2007/0269080 A1* 11/2007 Hamanaka ................... 382/106

* cited by examiner

*Primary Examiner*—Lin Ye
*Assistant Examiner*—Jason Whipkey
(74) *Attorney, Agent, or Firm*—Rosenberg, Klein & Lee

(57) ABSTRACT

An image unsharpness test method for a camera device, wherein firstly, during the focusing stage of an electronic camera device, the image with the highest sharpness is selected to be a contrast image; next, the contrast image is compared with a captured image to obtain the sharpness difference is too great, the captured image is determined to unsharp; vice versa, if the difference is very small, the captured image is determined to be sharp. Thereby, the image unsharpness test method for a camera device of the present invention not only can determine whether a captured is sharp enough but also can reduce the photographic errors and promote photographic efficiency.

21 Claims, 6 Drawing Sheets

IMAGE UNSHARPNESS TEST METHOD FOR A CAMERA DEVICE

BACKGROUND OF THE INVENTION

1. Field of the Invention

The present invention relates to a test method, particularly to an image unsharpness test method for a camera device, which can autonomously determine whether the captured image is sharp enough and can provide a proposal message to the user.

2. Description of the Related Art

With the advance of science and technology, many electronic camera devices, such as digital cameras, have emerged and are replacing conventional cameras. As to digital cameras, the user can check captured pictures in situ or anytime later from the attached LCD of digital camera; further, a digital camera directly records an image by digital data, which makes the processing and storage of the pictures more convenient; besides, the size of a digital camera is much smaller than that of a conventional camera, and thus, the portability of a digital camera is also much better than that of a conventional camera. Therefore, it is an obvious trend that digital cameras replace conventional cameras.

Owing to the progress of science and technology, the image quality of a digital camera has been greatly promoted from several hundred thousand pixels to more than twelve million pixels. Even magnified many times, such a high-resolution image can still maintain its definition. However, a high-resolution image occupies more memory space and needs a bigger memory. When the user takes a picture, there is usually a vibration transmitted from the hand to the digital camera. Even though the vibration is very slight, the captured image may still be blurred. When viewed in situ, such an image, which is displayed on the LCD viewer of the digital camera, may seem sharp because the size of a common LCD viewer is only about from 1.2 in. to 3.5 in. However, the user often surprisingly finds that the image is indistinct when it is presented on a large-size display device, such as CRT monitor or LCD, which is usually more than 15 in. Such a case besets the user very much, particularly a beginner, who not only needs a stager's counsel but also has to spend time and money to accumulate experience. Therefore, a method to determine whether an image captured by a digital camera is sharp enough is desired by users.

Accordingly, the present invention proposes an image unsharpness test method for a camera device to overcome the abovementioned problems.

SUMMARY OF THE INVENTION

The primary objective of the present invention is to provide an image unsharpness test method for a camera device, wherein a sharp image received during the focusing stage is compared with a captured image to determine whether the captured image is sharp enough, and the user is informed of the status of the captured image; thereby, the user not only can make sure that the capture has sufficient sharpness but also can reduce photographic errors and promote photographic efficiency.

Another objective of the present invention is to provide an image unsharpness test method for a camera device, which can provide the user with associated photographic proposal messages in situ when the user has taken a picture so that the user can rapidly accumulate photographic experience.

Further objective of the present invention is to provide an image unsharpness test method for a camera device, whereby a digital camera can has diversified usage and more added values.

To achieve the abovementioned objectives, the present invention proposes an image unsharpness test method for a camera device, wherein after an electronic camera device has taken a picture, the sharpness of the captured image is instantly determined; before the electronic camera device captures an image, there is a focusing stage; during the focusing stage, the electronic camera device receives multiple images; the sharpnesses of those received images are calculated to select an image having the highest sharpness, which is to be a contrast image; the contrast image is compared with the captured image to determine whether the contrast image and the captured image are of the same vision; if they are of the same vision, the sharpness of the captured image is compared with that of the contrast image to determine whether the captured image is sharp enough; if they are not of the same vision, a given number of the received images received before captured imaged taken is compared with each other to find out a specified image that has the highest sharpness; and the captured image is compared with the specified image to determine whether the captured image is sharp enough.

To enable the objectives, technical vision, characteristics, and accomplishments of the present invention to be more easily understood, the embodiments of the present invention are to be described below in detail in cooperation with the attached drawings.

DETAILED DESCRIPTION OF THE INVENTION

The present invention is an image unsharpness test method for a camera device, which applies to an electronic camera device, such as a digital camera, a digital video camera or a mobile phone with a digital camera. When an electronic camera device is used to capture a picture, the present invention not only can instantly determine the image sharpness of the captured picture but also can tell the user the status of the captured picture so that the user can in-situ get the quality of the captured pictured and promote photographic efficiency.

Figure 1:
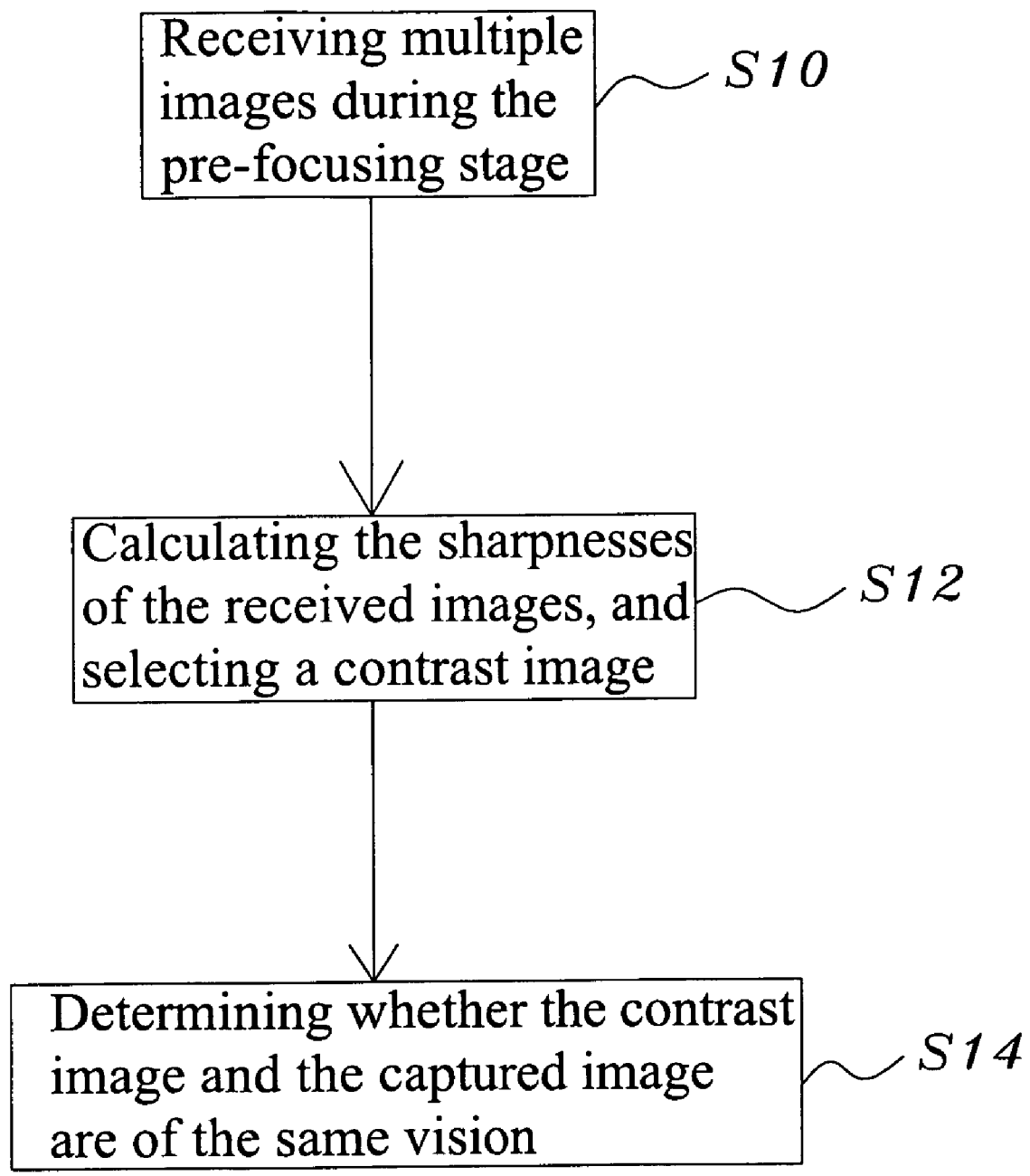
FIG. 1 is a flowchart of the focusing stage according to the present invention.

A digital camera is used to exemplify the embodiment of the present invention. The digital camera has an LCD screen and has the function of half-pressing shutter button, which is to undertake focusing actions. Refer to FIG. 1. Firstly, during the focusing stage, the electronic camera receives multiple images (Step S10). Next, the sharpness of each received image is evaluated, and the sharpnesses of those received images are compared to find out a received image having the highest sharpness, and the highest-sharpness received image is defined to be a contrast image (Step S12), wherein a factor is selected from the group consisting of Red value, Green value, Blue value and Gray value of a pixel, or a combination of them, is used to calculate sharpness, and the calculation equation is:

$$\text{Image sharpness} = \sum_{AP} \max \begin{pmatrix} [\text{Gray}(i,j) - \text{Gray}(i-1,j)], \\ [\text{Gray}(i,j) - \text{Gray}(i,j-1)] \end{pmatrix} \quad (1)$$

with AP denoting "all pixels" and (i, j) being the coordinate; in this embodiment, Gray value is used to calculate sharpness, but another factor, such as Red value, Green value or Blue value, may also be used.

Figure 2:
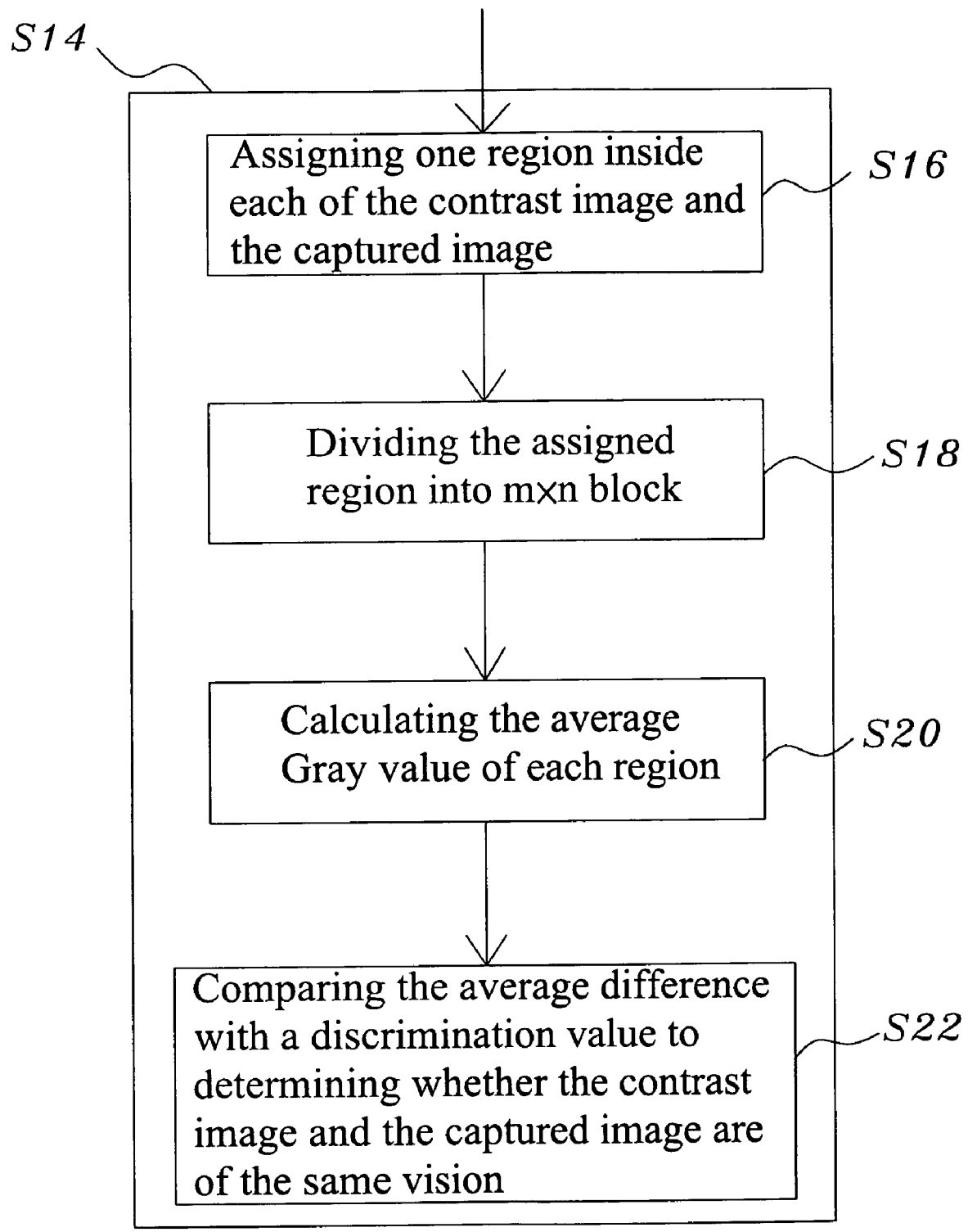
FIG. 2 is a flowchart of the process of determining whether the contrast image and the captured image are of the same vision according to the present invention.
Figure 3:
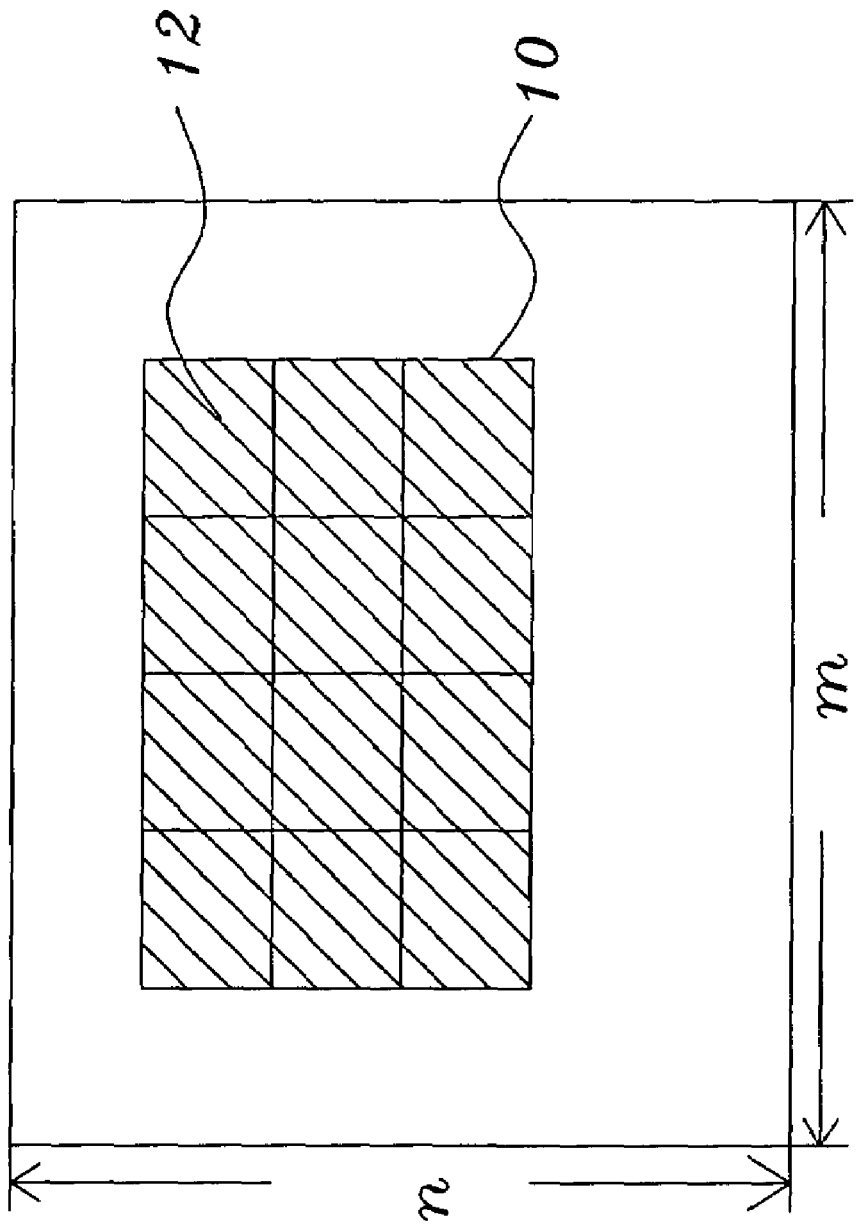
FIG. 3 is a diagram schematically showing the assigned region and the divided blocks of the contrast image or the captured image according to the present invention.

Next, the contrast image is compared with the captured image to determine whether the contrast image and the captured image are of the same vision (Step S14). Refer to FIG. 2 and FIG. 3, wherein FIG. 2 is a diagram showing the detail of Step S14. Inside the contrast image or the captured image, a region 10 is assigned, wherein the region 10 has the area of from 0% to 100% of the area of the contrast image or the captured image, (Step S16). As shown in FIG. 3, the assigned regions 10 of the contrast image and the captured image are respectively divided into m×n blocks 12 (Step S18). The abovementioned equation (1) is used to calculate the average Gray value of each block 12 of the region 10 (Step S20); the average Gray values of the contrast image and the captured image are respectively V1 and V2, and the difference of the average Gray values $Dif_0$ is calculated according to the following equation:

$$Dif_0 = \left[\frac{V2 - V1}{V1}\right] \times 100\% \quad (2)$$

The average difference $Dif_0$ is compared with a discrimination value to determine whether the contrast image and the captured image are of the same vision (Step S22); the discrimination value ranges from −30% to 30%, and it is preferred to range from −20% to 20%; if the average difference $Dif_0$ is lower than the discrimination value, the contrast image and the captured image are of the same vision; if the average difference $Dif_0$ is greater than the discrimination value, the contrast image and the captured image are not of the same vision.

Figure 4:
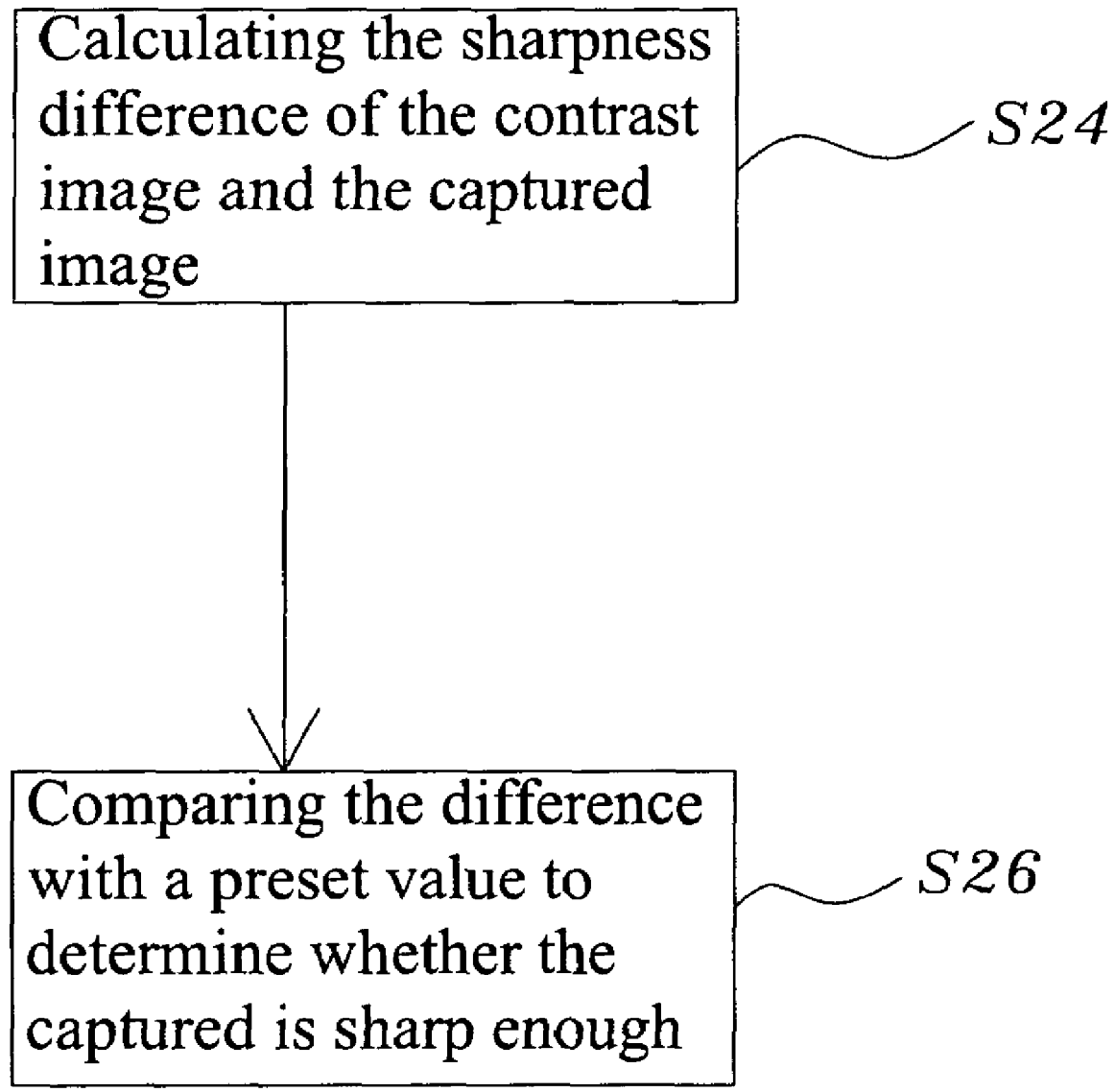
FIG. 4 is a flowchart of the process of determining whether the contrast image and the captured image are of the same vision when they are of the same vision.

Refer to FIG. 4. If the contrast image and the captured image are of the same vision, the abovementioned equation (1) is used to calculate the sharpness of the contrast image w1 and the sharpness of the captured image w2 (Step S24), and the difference value thereof. $Dif_1$ is calculated according to the following equation:

$$Dif_1 = \left[\frac{w2 - w1}{w1}\right] \times 100\% \quad (3)$$

Next, the difference value $Dif_1$ is compared with a preset value (Step S26); the preset value ranges from −70% to 30%, and it is preferred to range from −40% to 20%; if the difference value $Dif_1$ is lower than the preset value, the captured image is determined to be sharp; and if the difference value $Dif_1$ is greater than the preset value, the captured image is determined to be unsharp.

Figure 5:
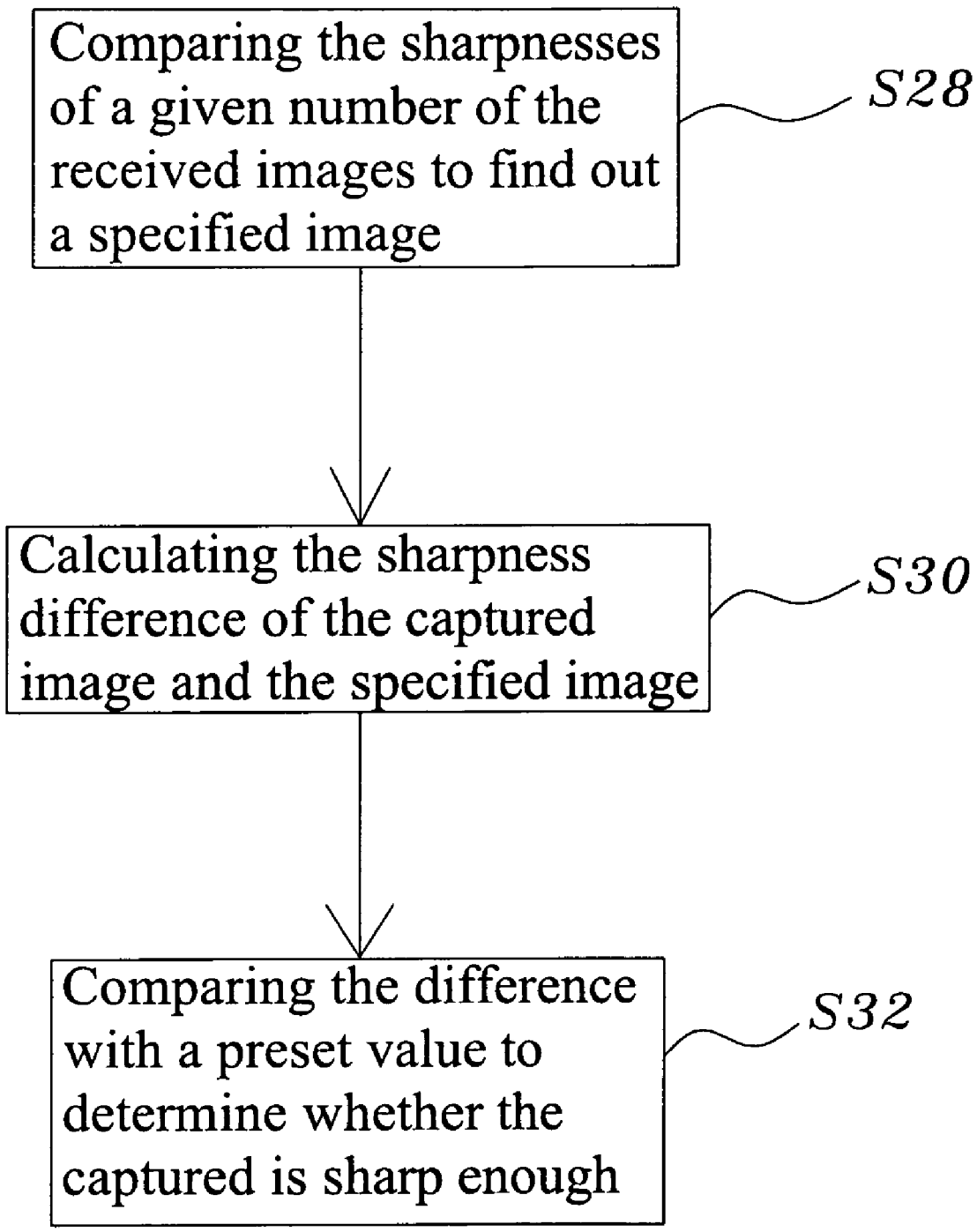
FIG. 5 is a flowchart of the process of determining whether the captured image and one image of specified set of images received after focusing stage and after capturing stage are of the same vision and whether the captured image is sharp enough or not when contrast image in focusing stage and captured image are not of the same vision.

Refer to FIG. 5. If the contrast image and the captured image are not of the same vision, the abovementioned equation (1) is used to calculate the sharpnesses of a given number of the images received after focusing stage and before capturing stage, and a received image having the highest sharpness is selected to be a specified image (Step S28), wherein the given number of the images are the images within from the last one to the last twenty images received before capturing stage. Then, the abovementioned equation (1) is used to calculate the sharpness of the specified image y1 and the captured image w2, and the difference value thereof. $Dif_2$ is calculated according to the following equation (Step S30):

$$Dif_2 = \left[\frac{w2 - y1}{y1}\right] \times 100\% \quad (4)$$

The difference value $Dif_2$ is compared with the abovementioned preset value (Step S32); if the difference value $Dif_2$ is lower than the preset value, the captured image is determined to be sharp; and if the difference value $Dif_2$ is greater than the preset value, the captured image is determined to be unsharp.

Figure 6:
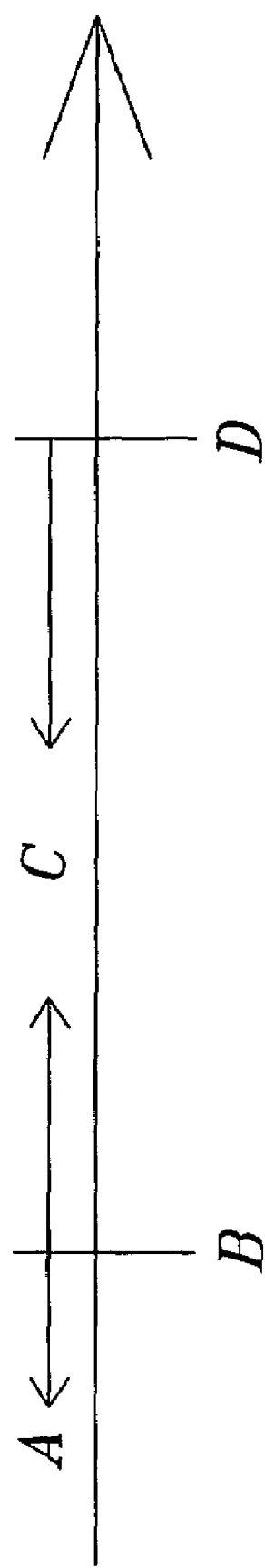
FIG. 6 is a diagram showing the steps of the present invention on a time axis.

Refer to FIG. 6 a diagram showing the steps of the present invention on a time axis. During time interval A, the user aims the digital camera at the object. At time point B, the user half-presses the shutter button. During time interval C, the digital camera undertakes focusing actions, which have been described in Step S10 and Step S12, and idle until shutter button is fully pressed down. At time point D, the shutter button is fully pressed down, and the digital camera captures the image of the object. The steps after time point D have been described in from Step S14 to Step S30. Thereby, whether the captured image is sharp enough can be determined.

If the captured image is determined to be unsharp, the digital camera will provide a notice message and a proposal message for the user. The notice message may be presented with a beep, a light, or a flash, or presented on the LCD screen of the digital camera. The proposal message may include: a suggestion of increasing light sensitivity (ISO) and a suggestion of using a tripod; the proposal message is preferably presented on the LCD screen of the digital camera also.

In the present invention, a sharp image received during the focusing stage is compared with the captured image to determine whether the captured image is sharp enough, and the user is informed of the status of the captured image so that the user can make sure that the captured image has sufficient sharpness, reduce photographic errors and promote photographic efficiency. Further, after the user has captured the image, the digital camera adopting the present invention can present related proposals in situ so that the user can rapidly accumulate photographic experience. Therefore, the present invention can enable an electronic camera device to have diversified usage and more added values.

The embodiments described above are to clarify the present invention in order to enable the persons skilled in the art to understand, make and use the present invention; however, it is not intended to limit the scope of the present invention, and any equivalent modification and variation according to the spirit of the present invention is to be also included within the scope of the claims stated below.

What is claimed is:

1. An image unsharpness test method for a camera device, which applies to an electronic camera device having a focusing stage before capturing an image, comprising the following steps:

receiving multiple images during said focusing stage;

calculating the sharpnesses of said images received during said focusing stage, and selecting the image having the highest sharpness to be a contrast image;

comparing said contrast image with a captured image to determine whether said contrast image and said captured image are of the same vision;

if said contrast image and said captured image are of the same vision, comparing the sharpness of said contrast image with the sharpness of said captured image to determine whether said captured image is sharp enough; and if said contrast image and said captured image are not of the same vision, comparing a given number of said images received after said focusing stage and before said capturing stage to find out a specified image having the highest sharpness, and comparing said specified image with said captured image to determine whether said captured image is sharp enough.

2. The image unsharpness test method for a camera device according to claim 1, wherein said step of "determine whether said contrast image and said captured image are of the same vision" further comprises the following steps: assigning one region inside each of said contrast image and said captured image; dividing each said region into multiple blocks; calculating the average Gray value of each block, and averaging the Gray values of all said blocks in each said region to obtain a total average value of each said region; if the difference between said total average values of two said regions is lower than a discrimination value, said contrast image and said captured image are of the same vision; and if the difference between said total average values of two said regions is greater than said discrimination value, said contrast image and said captured image are of different vision.

3. The image unsharpness test method for a camera device according to claim 2, wherein said discrimination value ranges from –30% to 30%.

4. The image unsharpness test method for a camera device according to claim 2, wherein said region assigned inside said contrast image has the area of from 0% to 100% of the area of said contrast image; said region assigned inside said captured image has the area of from 0% to 100% of the area of said captured image.

5. The image unsharpness test method for a camera device according to claim 2, wherein a factor selected from the group consisting of Red value, Green value, Blue value and Gray value, or a combination of them, is used to calculate said sharpness, and the calculation equation is:

$$\text{image sharpness} = \sum_{AP} \max\left( \begin{array}{l} [\text{Gray}(i, j) - \text{Gray}(i-1, j)], \\ [\text{Gray}(i, j) - \text{Gray}(i, j-1)] \end{array} \right)$$

with AP denoting "all pixels" and (i, j) being the coordinate of said block; in this equation, Gray value is used to calculate said sharpness, but another factor may also be used.

6. The image unsharpness test method for a camera device according to claim 2, wherein the average sharpnesses of said contrast image and said captured image are respectively V1 and V2, and the difference of the average sharpnesses $\text{Dif}_0$ is calculated according to the following equation:

$$\text{Dif}_0 = \left[ \frac{V2 - V1}{V1} \right] \times 100\%$$

7. The image unsharpness test method for a camera device according to claim 1, wherein said "comparing said contrast image with a captured image" is respectively calculating the sharpnesses of said contrast image and said captured image to obtain the difference thereof.

8. The image unsharpness test method for a camera device according to claim 7, wherein a factor selected from the group consisting of Red value, Green value, Blue value and Gray value of the pixels of said contrast image and said captured image, or a combination of them, is used to calculate said sharpnesses, and the calculation equation is:

$$\text{image sharpness} = \sum_{AP} \max\left( \begin{array}{l} [\text{Gray}(i, j) - \text{Gray}(i-1, j)], \\ [\text{Gray}(i, j) - \text{Gray}(i, j-1)] \end{array} \right)$$

with AP denoting "all pixels of said image" and (i, j) being the coordinate of said block; in this equation, Gray value is used to calculate said sharpness, but another factor may also be used.

9. The image unsharpness test method for a camera device according to claim 7, wherein said difference is expressed by percentage; the sharpnesses of said contrast image and said captured image are respectively w1 and w2, and said difference is calculated according to the following equation:

$$\text{Dif}_1 = \left[ \frac{w2 - w1}{w1} \right] \times 100\%$$

10. The image unsharpness test method for a camera device according to claim 7, wherein if said difference is lower than a preset value, said captured image is determined to be sharp; and if said difference is greater than said preset value, said captured image is determined to be unsharp.

11. The image unsharpness test method for a camera device according to claim 10, wherein said preset value ranges from –70% to 30%.

12. The image unsharpness test method for a camera device according to claim 1, wherein a factor selected from the group consisting of Red value, Green value, Blue value and Gray value, or a combination of them, is used to calculate said sharpness, and the calculation equation is:

$$\text{image sharpness} = \sum_{AP} \max\left( \begin{array}{l} [\text{Gray}(i, j) - \text{Gray}(i-1, j)], \\ [\text{Gray}(i, j) - \text{Gray}(i, j-1)] \end{array} \right)$$

with AP denoting "all pixels" and (i, j) being the coordinate of said block; in this equation, Gray value is used to calculate said sharpness, but the other factors may also be used.

13. The image unsharpness test method for a camera device according to claim 1, wherein said electronic camera device may be a digital camera, a digital video camera or a mobile phone with a digital camera.

14. The image unsharpness test method for a camera device according to claim 13, wherein if said electronic camera device is a digital camera, half-pressing a shutter button of said digital camera will start the action of said focusing stage.

15. The image unsharpness test method for a camera device according to claim 1, further comprising a step of providing a notice message for the user when said captured image is determined to be unsharp.

16. The image unsharpness test method for a camera device according to claim 15, wherein said notice message may be a beep, a light, or a flash.

17. The image unsharpness test method for a camera device according to claim 15, wherein said electronic camera device has a display to present said notice message.

18. The image unsharpness test method for a camera device according to claim 1, further comprising a step of providing a proposal message for the user when said captured image is determined to be unsharp.

19. The image unsharpness test method for a camera device according to claim 18, wherein said proposal message may be a suggestion of increasing light sensitivity or a suggestion of using a tripod.

20. The image unsharpness test method for a camera device according to claim 18, wherein said electronic camera device has a display to present said proposal message.

21. The image unsharpness test method for a camera device according to claim 1, wherein said given number of said images are the images within from the last one to the last twenty images received by said electronic camera device after said focusing stage and before said electronic camera device captures an image.

* * * * *